(No Model.)

J. GRANT.
WATER FILTER.

No. 399,875. Patented Mar. 19, 1889.

WITNESSES.
William Edson
Frank G. Parker

INVENTOR.
Jott Grant

UNITED STATES PATENT OFFICE.

JOTT GRANT, OF BOSTON, MASSACHUSETTS.

WATER-FILTER.

SPECIFICATION forming part of Letters Patent No. 399,875, dated March 19, 1889.

Application filed July 6, 1888. Serial No. 279,195. (No model.)

*To all whom it may concern:*

Be it known that I, JOTT GRANT, of Boston, in the county of Suffolk and State of Massachusetts, have invented a new and useful Improvement in Water-Filters, of which the following, taken in connection with the accompanying drawings, is a specification.

My invention relates to that class of filters in which the filtration is effected by the use of finely-granulated material—charcoal, for instance—inclosed in a case or chamber attached to a water-pipe, the object being to construct a self-cleansing filter that is simple, cheap, and durable. This object I attain by the mechanism shown in the accompanying drawings, in which—

Figure 1:
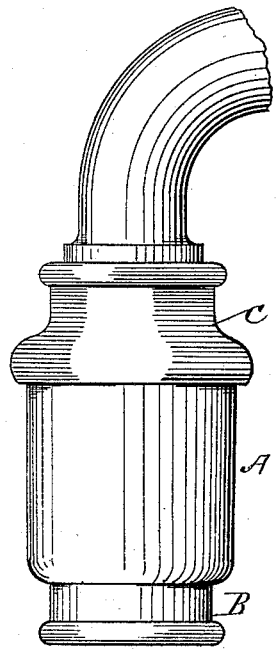
Figure 2:
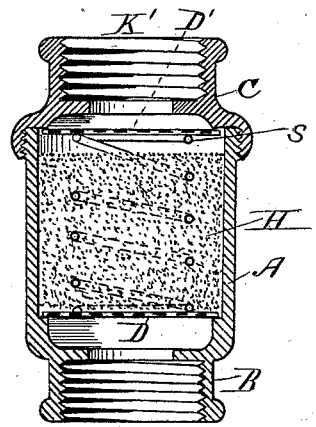
Figure 3:
Figure 4:
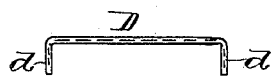

Figure 1 is an elevation of my filter, represented as attached to a faucet. Fig. 2 is a vertical section of my filter. Fig. 3 is a section through one of the perforated diaphragms used at the ends of the filter for the purpose of retaining the granulated filtering material, and Fig. 4 is a section showing a modified form of the perforated diaphragm.

In the drawings I have shown my filter made so as to be reversed, if desired, although it is not necessary to make this filter in this manner, as the cleansing can be effected without the trouble of reversing the filter or removing it from the faucet, as will be explained.

The main cylinder or body A of my filter is made as shown in Figs. 1 and 2, one end being provided with a contracted neck, B, having an internal screw-thread, K. The other end has a screw-cap, C, also provided with an internal screw, K'. The screws K and K' are adapted to fit a corresponding screw made on the discharge end of the faucet, so that the filter may be easily attached to or detached from the faucet.

D and D', Fig. 2, are perforated diaphragms loosely placed in the ends of the filter-chamber, resting against shoulders, as shown, pressed apart by the spiral spring S, Fig. 2. The spring S, Fig. 2, is made "open," as shown, so that the filtering material H can freely enter all parts—that is, between the coils and also into the center. Instead of the single spring S, two or more may be used.

The chamber of the filter is nearly full of some suitable filtering material properly granulated. The object of not filling the chamber of the filter full is to allow the upper diaphragm, D, in this case to be depressed by a sudden and violent throw of water, which depression will cause the coils of the spring S to move, thus adjusting the filtering material H and preventing it from being clogged.

In Fig. 4 I have shown a modified form of the diaphragm—that is, this diaphragm is made with a rim, *d d*, so as to slide more securely in the cylinder and not be so liable to get slanted and caught, and not move readily with the first impulse of the inflowing current of water.

The principle of action of my filter is as follows: The chamber, being but partially full of filtering material H, will allow the first flow of water, when the stream is suddenly turned on, to strike the unconfined filtering material H and violently agitate it. This agitation is aided by the action of the spring S, which will at first be depressed and then react, thus causing the filtering material H to be moved and loosened. So long as the agitation continues the material H will be worked, all of the impurities being removed; but a continued flow of water soon causes the filtering material to settle back into its place and to act as a filter so long (for a reasonable time) as the current is steady. When the current is stopped, the parts remain ready to be again acted upon by a sudden turning on of the stream, and the forces will be repeated. When desirous to refill my filter, I have only to remove the screw-cap C and reverse the filter. Then the diaphragm D', spring S, and filling material H will all fall out, and a new charge can be put in and the parts replaced. To afford an additional means of cleansing my filter, I make it reversible—that is, either end may be attached to the end of the faucet—it working with equal efficiency either end up.

I claim—

In a filter having shoulders for the diaphragms to rest against, the combination of two freely-moving diaphragms, D D', placed at the ends of the interior chamber and having between them loosely-packed filtering material H, with the spring S, adapted to hold the two diaphragms D and D' against the said shoulders and to yield under the sudden shock of the incoming water and then react automatically, so as to loosen the filtering material, all constructed substantially as described, and for the purpose set forth.

JOTT GRANT.

Witnesses:
 FRANK G. PARKER,
 WILLIAM EDSON.